United States Patent
Rust et al.

(10) Patent No.: US 10,167,015 B2
(45) Date of Patent: Jan. 1, 2019

(54) SYSTEM FOR RETROFITTING VEHICLE AUTOMATION

(71) Applicant: GM GLOBAL TECHNOLOGY OPERATIONS LLC, Detroit, MI (US)

(72) Inventors: Ian Rust, San Francisco, CA (US); Rita Ciarvino, San Francisco, CA (US); Matthew Graney, San Francisco, CA (US); Yung-Chang Ko, San Francisco, CA (US); Kyle Vogt, San Francisco, CA (US); Kevin Chu, San Francisco, CA (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 6 days.

(21) Appl. No.: 15/150,992

(22) Filed: May 10, 2016

(65) Prior Publication Data
US 2016/0334790 A1 Nov. 17, 2016

Related U.S. Application Data

(60) Provisional application No. 62/159,494, filed on May 11, 2015, provisional application No. 62/257,838, filed on Nov. 20, 2015.

(51) Int. Cl.
*B60T 13/66* (2006.01)
*B62D 15/02* (2006.01)
(Continued)

(52) U.S. Cl.
CPC ............ *B62D 15/0215* (2013.01); *B60T 7/22* (2013.01); *B60T 13/662* (2013.01); *B62D 5/04* (2013.01); *B60T 2201/022* (2013.01)

(58) Field of Classification Search
CPC .... B60T 13/662; B60T 8/4081; B60T 13/745; B60T 2220/04; B60T 17/22; B60T 13/586; B60T 13/58; B60T 13/66; B60L 2240/423; B60L 3/0061; B60L 2240/465; B60L 1/003; B62D 15/02; B62D 6/00; B62D 6/10; B62D 3/12; B62D 55/08; B62D 5/04
(Continued)

(56) References Cited

U.S. PATENT DOCUMENTS 3,818,804 A * 6/1974 Miller .................. B60T 8/26
188/106 F
5,749,633 A 5/1998 Baumgartner
(Continued)

*Primary Examiner* — Courtney D Heinle
*Assistant Examiner* — Luis A Martinez Borrero
(74) *Attorney, Agent, or Firm* — Lorenz & Kopf, LLP

(57) ABSTRACT

An autonomous vehicle retrofit system includes: a central computer; and a braking interface to decelerate a wheel of a vehicle via actuation of a brake caliper, the braking interface further including a brake pedal; a first master cylinder assembly, mechanically coupled to the brake pedal such that actuation of the brake pedal causes actuation of the first master cylinder assembly; a second master cylinder assembly, coupled to the central computer such that the central computer controls actuation of the second master cylinder assembly; and an actuator selector, hydraulically coupled to the brake caliper, that selectively actuates the brake caliper in response to actuation of at least one of the first master cylinder assembly and the second master cylinder assembly.

10 Claims, 16 Drawing Sheets

(51) Int. Cl.
  *B62D 5/04* (2006.01)
  *B60T 7/22* (2006.01)
(58) Field of Classification Search
  USPC .................................. 701/70, 78, 83, 41, 74
  See application file for complete search history.

(56) References Cited

U.S. PATENT DOCUMENTS

| | | | | |
|---|---|---|---|---|
| 6,820,715 B2* | 11/2004 | Laurent | ................ | B62D 5/003 |
| | | | | 180/443 |
| 7,364,482 B1* | 4/2008 | Wong | .................. | B63H 25/28 |
| | | | | 440/1 |
| 7,497,528 B2* | 3/2009 | Reuter | ................... | B60T 7/042 |
| | | | | 303/113.4 |
| 7,894,951 B2 | 2/2011 | Norris et al. | | |
| 8,113,892 B1* | 2/2012 | Gable | ................... | B63H 21/21 |
| | | | | 114/144 RE |
| 8,544,964 B2 | 10/2013 | Rekow et al. | | |
| 8,954,235 B2 | 2/2015 | Lee et al. | | |
| 9,268,332 B2 | 2/2016 | Montemerlo et al. | | |
| 9,823,659 B2* | 11/2017 | Holmberg | ............ | G05D 1/0212 |
| 2004/0116228 A1* | 6/2004 | Thompson | ........... | B60K 7/0007 |
| | | | | 475/28 |
| 2004/0193344 A1* | 9/2004 | Suzuki | .................... | B60T 8/885 |
| | | | | 701/41 |
| 2004/0238257 A1* | 12/2004 | Takahashi | ............. | B62D 5/006 |
| | | | | 180/402 |
| 2005/0072621 A1* | 4/2005 | Hara | ...................... | B62D 1/163 |
| | | | | 180/444 |
| 2008/0108256 A1* | 5/2008 | Mizutani | ................ | B63H 20/12 |
| | | | | 440/1 |
| 2008/0224533 A1* | 9/2008 | Nakada | ................. | B60T 8/4059 |
| | | | | 303/10 |
| 2010/0062897 A1* | 3/2010 | Nishino | .................... | B60T 1/10 |
| | | | | 477/29 |
| 2011/0004385 A1* | 1/2011 | Ishimoto | ................... | B60T 7/12 |
| | | | | 701/70 |
| 2011/0006594 A1* | 1/2011 | Ganzel | ................. | B60T 8/4077 |
| | | | | 303/10 |
| 2016/0082937 A1* | 3/2016 | Nakaoka | ............... | B60T 8/885 |
| | | | | 303/15 |
| 2016/0114798 A1* | 4/2016 | Kim | ...................... | B60W 30/09 |
| | | | | 701/41 |
| 2016/0121868 A1* | 5/2016 | Nimura | ..................... | B60T 8/38 |
| | | | | 303/6.01 |
| 2016/0272474 A1* | 9/2016 | Keller | ..................... | B62D 5/12 |
| 2017/0028992 A1* | 2/2017 | Sautter | ................. | B60W 10/18 |
| 2017/0106859 A1* | 4/2017 | Kim | ...................... | B60W 30/09 |
| 2017/0232948 A1* | 8/2017 | Leiber | .................. | B60T 8/4081 |
| | | | | 303/11 |
| 2017/0327098 A1* | 11/2017 | Leiber | .................. | B60T 8/4031 |

\* cited by examiner

Brakes at 20%, set by actuator 121

Brakes at 60% due to user intervention (actuator 121 still set for 20% braking)

SYSTEM FOR RETROFITTING VEHICLE AUTOMATION

CROSS-REFERENCE TO RELATED APPLICATIONS

This application claims the benefit of U.S. Provisional Application Ser. No. 62/159,494, filed on 11, May 2015, and U.S. Provisional Application Ser. No. 62/257,838, filed on 20 Nov. 2015, both of which are incorporated in their entireties by this reference.

TECHNICAL FIELD

This invention relates generally to the vehicle automation field, and more specifically to new and useful systems for retrofitting vehicle automation.

BACKGROUND

Vehicle automation has been suggested as a solution to increasing vehicle safety almost as long as cars have been in existence—experiments on autonomy in cars have been conducted since at least the 1920s. Only recently, though, has computer technology advanced enough to make true vehicle automation possible. Still, many current autonomous or semi-autonomous vehicles are expensive and purpose-built (or heavily modified from original cars)—and few of these vehicles are even available for purchase. As a result, the safety benefits of autonomous driving are confined to the few, instead of open to the many. Thus, there is a need in the vehicle automation field to create systems for retrofitting existing vehicles with autonomous driving capabilities. This invention provides such new and useful systems.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Vehicle safety is an important issue in society today, and according to many, vehicle automation is the best chance we have to solve this issue once and for all.

The good news is that true autonomous vehicle operation is close to being reality. The bad news is that existence of the technology in no way implies availability. As long as self-driving cars remain little more than research projects or toys for the wealthy, vehicle automation won't be able to make a dent in our national driving safety crisis.

The inventions of the present application are directed to systems designed to retrofit existing cars with self-driving capabilities. These systems enable consumers to take advantage of the myriad benefits of vehicle automation, resulting in a safer driving experience not just for system adopters, but for drivers everywhere.

Figure 1A:
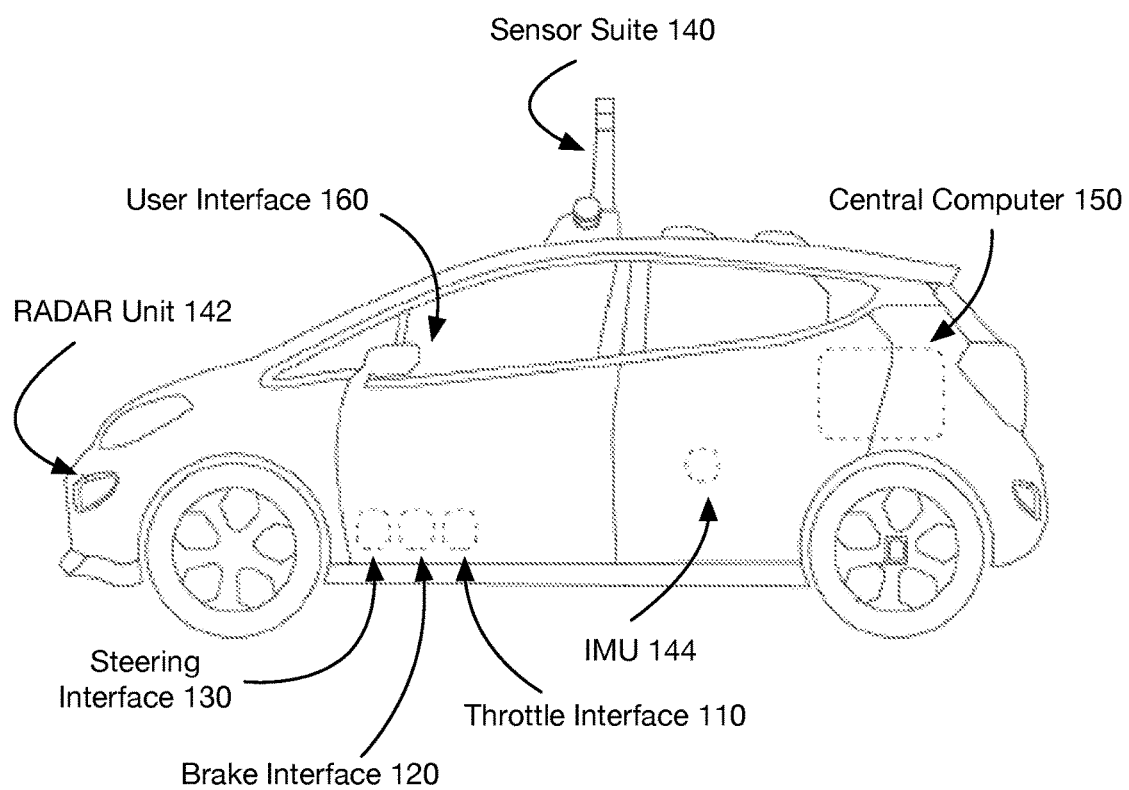
FIG. 1A and FIG. 1B are diagram representations of a system of an invention embodiment.
Figure 1B:
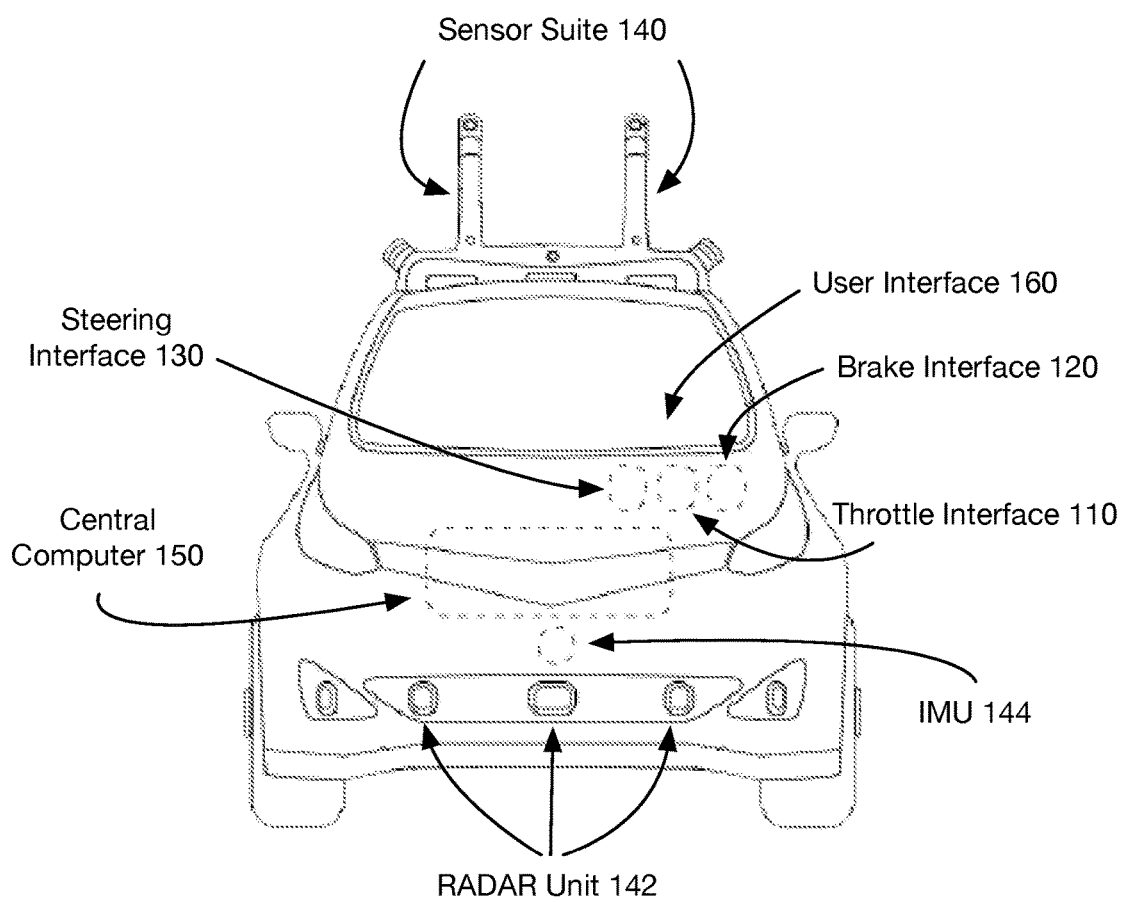

A system 100 for retrofitting vehicle automation includes a throttle interface 110, a brake interface 120, a steering interface 130, a sensor suite 140, a central computer 150, and a user interface 160, as shown in FIG. 1. The system functions to enable autonomous or semi-autonomous operation of a vehicle not originally intended for such operation by interfacing with existing vehicle manual controls and/or computer interfaces.

The system 100 is preferably intended for implementation with mass-manufactured automobiles, but may additionally or alternatively be implemented in any suitable manually controlled motor vehicle; for example, watercraft, light machinery, motorcycles, etc. In the present application, examples are presented under the assumption of implementation in an automobile. A person of ordinary skill in the art will recognize that the details of these examples may be modified for alternative implementations. The following paragraphs will assume installation of the system 100 in a mass-manufactured automobile (i.e., 'the car').

The throttle interface 110 functions to control the acceleration of the car. The throttle interface 110 preferably controls acceleration in a manner analogous to the existing car throttle interface (e.g., the gas pedal), but may additionally or alternatively control acceleration in any suitable manner.

The throttle interface 110 is preferably controlled by the central computer 150, but may additionally or alternatively be controlled by any suitable system.

Figure 2A:
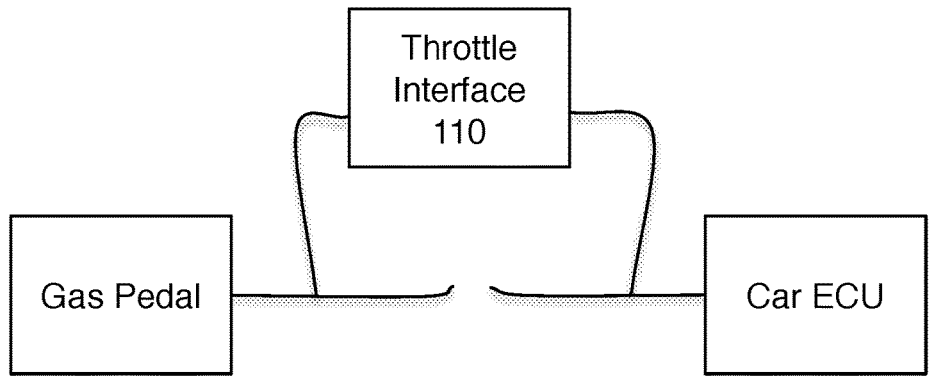
FIGS. 2A, 2B, and 2C are diagram representations of a throttle interface of a system of an invention embodiment.

In a preferred embodiment of the invention, the throttle interface 110 is designed to take advantage of electronic throttle control ('drive by wire'), as shown in FIG. 2A. More specifically, the throttle interface no preferably interfaces with the throttle by producing an electrical signal substantially similar to (and potentially in place of) the electrical signal transmitted by the car's gas pedal; additionally or alternatively, the throttle interface 110 may interface with the throttle in any suitable manner.

Figure 2B:
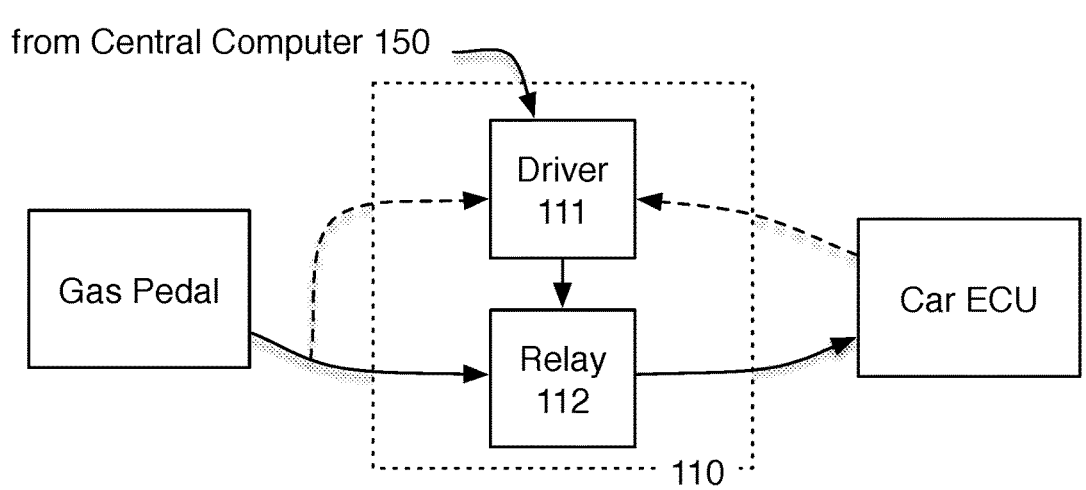

The throttle interface no preferably includes a driver circuit in and a switching relay 112, as shown in FIG. 2B. The driver circuit 111 functions to produce the throttle signal used to imitate the gas pedal signal, while the switching relay 112 allows the throttle interface to switch between the output of the driver circuit in and the output of the gas pedal (or any other throttle).

The driver circuit 111 functions to produce a throttle signal in response to input from the central computer 150. This throttle signal is preferably transmitted to the car's electronic control unit (ECU), where it is interpreted as a signal from a native throttle control (e.g., a gas pedal of the car); additionally or alternatively, the throttle signal is transmitted to any suitable component of the car. For example, the throttle signal may be transmitted to a car component that directly controls the native throttle control through an electromechanical means (e.g., the signal is sent to a component of the car that can translate that signal into physical depression or release of the gas pedal). The throttle signal produced by the driver circuit is preferably a DC signal having a voltage between 0 and 5V, but may additionally or alternatively be any suitable signal (e.g., a digital signal encoding a particular throttle position).

The driver circuit in allows control of the vehicle throttle via a control signal sent by the central computer 150 (or by any other part of the system 100). The central computer 150 preferably enumerates a particular output voltage for the driver circuit 111 (corresponding to a desired throttle position), but the central computer 150 may additionally or alternatively control the driver circuit 111 in any manner. For example, the central computer 150 may specify a particular acceleration, and the driver circuit 111 may set an output voltage based on that acceleration (the translation between acceleration and output voltage being performed by the driver circuit in). The driver circuit 111 can translate between a target acceleration and an output voltage by using, for example, a proportional-integral-derivative (PID) controller, a pre-calibrated translation table, a user-input translation table, a translation table derived from a machine learning algorithm, a combination of these translation methods, or by any other suitable means. With a PID controller, the output voltage can be set, for example, by coefficients which control throttle adjustments based on three terms: 1) the proportional error between a target acceleration and an actual acceleration of the car at the present time; 2) the integrated error between a target acceleration and an actual acceleration of the car over an integration time; and 3) the rate of change of the error between a target acceleration and an actual acceleration of the car at the present time, the rate of change characterized by an instantaneous time derivative of the error. Adjusting the weights of these terms (e.g., via pre-characterization, user-tuning, dynamic adjustments, a machine learning algorithm, etc.) can produce a stable control feedback mechanism that adjusts the acceleration of the car until it approaches the target acceleration. A pre-calibrated translation table corresponds to a pre-determined method for converting a target acceleration into an output voltage of the driver circuit 111. The method could depend on tiers of acceleration ranges (e.g., a first fixed output voltage for target accelerations between 0 and 1 mph/s, a second fixed output voltage for target accelerations between 1 mph/s and 2 mph/s, etc.), on manufacturer (e.g., Ford, Mazda, etc.), model of the car engine (e.g., 13B-MSP Renesis engine, 1.0 L EcoBoost I-3 engine, etc.), on propulsion system (e.g., gasoline, diesel, propane, natural gas, hybrid, electric, fuel cell, etc.), on number of strokes to complete a power cycle (e.g., two-stroke engine, four-stroke engine, etc.), on number of engine cylinders (e.g., four, six, eight, etc.), on engine configuration (e.g., U engine, V engine, W engine, straight or inline engine, etc.), on horsepower (a first translation table for cars with 0-50 HP, a second for cars with 50-100 HP, etc.), on ignition type (e.g., spark ignition, compression ignition, etc.), or on any other suitable characteristic. For pre-calibrated translation tables with tiers, the translation table may also apply a smoothing function (e.g., linear interpolation, Savitzky-Golay smoothing filter, smoothing spline, etc.) to parameter adjustments between tiers, which may minimize abrupt acceleration changes during a transition between tiers. A user-input translation table could be statically (e.g., set by the user before operation of the car) or dynamically adjusted (e.g., while the user is operating the car). In one realization of a user-input translation table, the user may program the translation characteristics by means of an external electronic device (e.g., laptop, smartphone, etc.) interfacing with the central computer 150. A translation table derived from a machine learning algorithm could begin with an initial translation table (e.g., a pre-calibrated translation table, a user-input translation table, etc.) and then tweak the initial translation table to suit the particular user (e.g., based on monitored performance of the user). Any suitable machine learning algorithm implementing feedback from any suitable monitored user behavior may be used. Any other suitable translation table (and/or combination of translation methods) may also be used.

The driver circuit 111 is preferably a circuit that takes a digital input (e.g., throttle position) sent by the central computer 150 and converts it into an analog signal for use by a car ECU (e.g., as performed by a microprocessor of the driver circuit in), but the driver circuit 111 may additionally or alternatively be any suitable circuit. The microprocessor performing the digital-to-analog (DAC) conversion may include a pulse-width modulator, a pulse-density modulator, an R-2R ladder, a hybrid DAC (using a combination of DAC conversion techniques), or any other suitable DAC converter.

The driver circuit 111 may additionally or alternatively take signals from the gas pedal (or other throttle control) as input. For example, the driver circuit 111 may increase the output of the driver circuit 111 (corresponding to an increase in throttle at the car ECU) in response to a user pressing on a gas pedal. The driver circuit 111 may determine output signals based on any number of input signals. As a first example, the driver circuit 111 may determine output signals based on only a single input signal. As a first specific example of this first example, the driver circuit 111 may only interface with a single throttle control input (e.g., only the gas pedal, only the throttle interface, etc.) and so may only determine the output based on that single throttle control input. As a second specific example of this first example, the driver circuit 111 may output signals based on only a single input signal even though the driver circuit 111 accepts more than one input signal. In this second specific example of this first example, the driver circuit 111 may include a decision procedure algorithm (e.g., to use the input with the largest amplitude, to default to an input judged to have originated from a user, to default to an input from the throttle interface, to use decision tree learning to decide which input to use, etc.) for deciding which of the more than one input signals to use as the basis for the output signal. As a second example, the driver circuit 111 may determine output signals based on a plurality of signal inputs. As a first specific example of this second example, the driver circuit 111 may output a signal based on a mathematical operation related to the plurality of signal inputs (e.g., based on the average of the plurality of signal inputs, based on the median of the plurality of signal inputs, based on the sum of the plurality of signal inputs, based on the average of the rate of change of the plurality of signal inputs, etc.). As a second specific example of this second example, the driver circuit 111 may output a signal based only on a subset of the plurality of signal inputs. The subset of the plurality of signal inputs may be determined by a decision procedure algorithm (e.g., based on a predictive model, based on capping the number of signal inputs that can be used to a particular amount and using an optimization procedure to find the optimal inputs under the cap, prioritizing inputs judged to have originated from a user, etc.), based on a mathematical operation (e.g., only those signal inputs above a threshold amplitude, excluding those signal inputs judged to be outliers, etc.), or by any other suitable means.

Figure 2C:
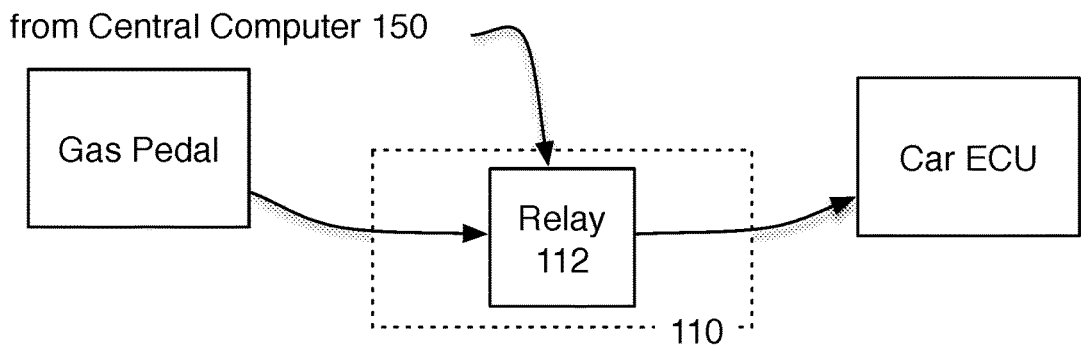

In a variation of a preferred embodiment, the throttle interface 110 may not include a driver circuit 111, as shown in FIG. 2C. In this variation, the throttle signal is preferably transmitted directly from the central computer 150, but may additionally or alternatively be transmitted from any suitable component of the system 100. For example, the central computer 150 may transmit a signal that directly results in the depression and/or the release of the gas pedal by an electromechanical means, thereby circumventing the need for an intermediate driver circuit 111.

The switching relay 112 functions to allow the throttle interface 110 to default to the signal from the gas pedal (or other throttle control) if necessary. By allowing the gas pedal to control the car ECU directly, the switching relay 112 allows manual control of throttle even if other parts of the system 100 are rendered inoperable.

The switching relay 112 may default to the gas pedal signal for any reason (e.g., a timeout of computer communications).

The switching relay 112 preferably allows signals from either the gas pedal or the throttle interface 110 to pass to the car ECU, but not both. In this instance, the switching relay 112 preferably has an "automatic control" state (i.e., where the throttle interface 110 controls the throttle) and a "manual control" state (i.e., where the gas pedal controls the throttle directly). The switching relay 112 preferably latches to the manual control state when power is lost (so that in the event of system 100 failure, the throttle is manually controllable).

Figure 3:
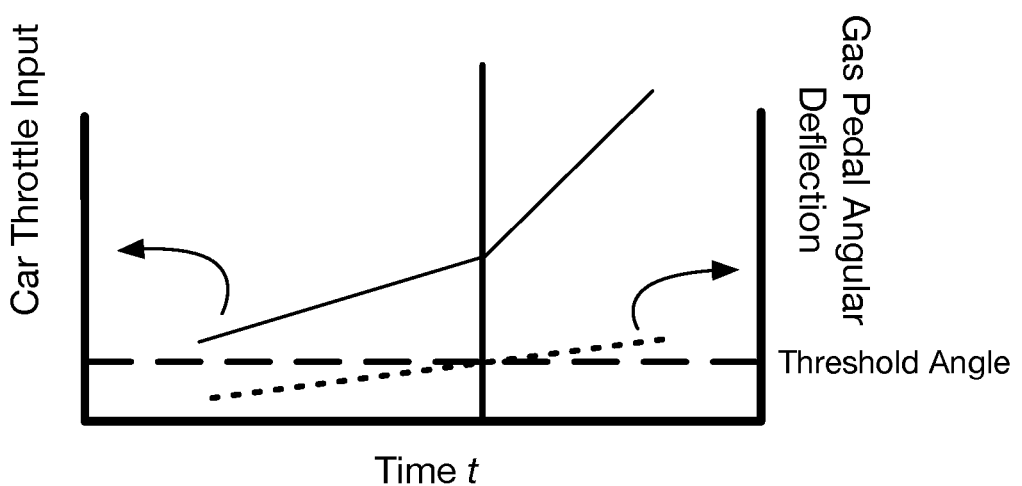
FIG. 3 is a graphical representation of an operating throttle interface of a system of an invention embodiment.

Additionally or alternatively, the switching relay 112 may pass any combination of signals (e.g., sum of input one and input two) to the car ECU. For example, the switching relay 112 may pass the sum of a throttle interface signal and a signal corresponding to the gas pedal when the user is trying to supplement (i.e., not override) the acceleration due to the throttle interface signal, as shown in FIG. 3.

The state of the switching relay 112 (i.e., how the input signals correspond to an output signal) is preferably controlled by the throttle interface no in response to input from the control computer 150, but may additionally or alternatively be controlled in any suitable way. In a first example, the central computer 150 may decide that the user is trying to supplement the acceleration due to the throttle interface signal (and hence pass the sum of both the throttle interface signal and a signal corresponding to the gas pedal) if the signal corresponding to the gas pedal onsets gradually (e.g., slower than a gas pedal onset threshold), based on a machine learning algorithm dependent on monitored behavior of the user (e.g., based on how quickly the user actuates the gas pedal when the car is in a manual control state), or in any other suitable manner. In the specific example of a decision based on a gradual onset of the gas pedal, the gas pedal onset threshold can be statically determined (e.g., pre-programmed by a manufacturer, pre-programmed by a user, etc.), dynamically adjusted (e.g., adjusted by the user, adjusted by the central computer 150 based on monitored behavior of the user, etc.), or in any other suitable way. In a second example, the central computer 150 may infer a problem with the automatic control state if the acceleration of the car (or if the target acceleration of the car from the throttle interface) exceeds a threshold acceleration; in this instance, the central computer may decide that the user is not trying to supplement the acceleration due to the throttle interface signal and place the switching relay 112 into a manual control state. In this specific example, the threshold acceleration can be statically determined (e.g., pre-programmed by the manufacturer in accordance with a specification of a component of the car, pre-programmed by the manufacturer in accordance with local speed laws, pre-programmed by the user, etc.), dynamically adjusted (e.g., adjusted by the user, adjusted by the central computer 150 based on monitored behavior of the user, etc.), or in any other suitable way.

In a variation of a preferred embodiment, the throttle interface 110 does not include a switching relay 112. For example, a car ECU may allow two throttle inputs, obviating the need to switch between the inputs prior to the ECU. In a second example of this variation, a car ECU may allow more than two throttle inputs without a switching relay 112.

The switching relay 112 is preferably a latching mechanical relay, but may additionally or alternatively be any suitable relay (e.g., a solid state relay, a reed relay, mercury relay, mercury-wetted relay, polarized relay, machine tool relay, coaxial relay, time delay relay, contactor, etc.) or any circuitry capable of switching between two signals (e.g., a microprocessor with switchable outputs). The switching relay 112 may include circuitry to smooth signals while switching (e.g., a capacitor, an RC filter, an LC filter, a voltage regulator, or any other suitable filter or smoothing circuit); that is, preventing a switchover from causing overly rapid throttle changes.

Additionally or alternatively to the above, the throttle interface 110 may combine native throttle signals (i.e., throttle signals produced by pre-retrofit equipment) and artificial throttle signals (i.e., throttle signals produced by the throttle interface 110 or by another part of the system 100) in any suitable way.

While the throttle interface 110 preferably interfaces with electronic throttle controls, the throttle interface 110 may additionally or alternatively interface with mechanical throttle controls (or any other throttle controls). For example, the throttle interface no may include a cable mechanism that connects to the gas pedal (analogous to operation of the brake interface 120, described in more detail below). As another example, the throttle interface 110 may connect directly to the throttle body of an internal combustion engine or to electric motors that drive the car.

Figure 4:
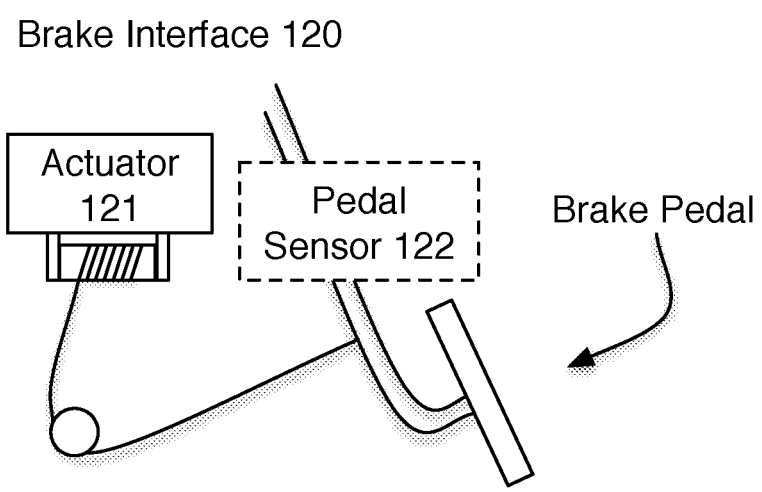
FIG. 4 is a diagram representation of a brake interface of a system of an invention embodiment.

The brake interface 120 functions to control deceleration of the car. In a first implementation of a preferred embodiment, the brake interface 120 preferably includes a brake actuator 121 and may additionally include a pedal sensor 122, as shown in FIG. 4.

The brake actuator 121 functions to actuate brakes of the car based on input from the central computer 150. In the first implementation of a preferred embodiment, the brake actuator 121 preferably includes an electric motor coupled to a brake pedal of the car. To actuate brakes of the car, the electric motor moves the brake pedal (e.g., just as a person attempting to apply brakes would).

Figure 5A:
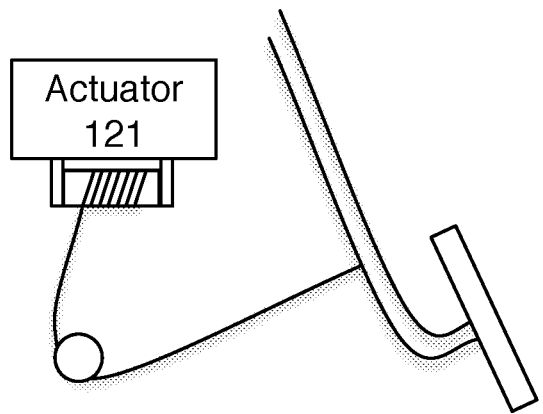
FIGS. 5A and 5B are diagram representations of a brake interface of a system of an invention embodiment.
Figure 5B:
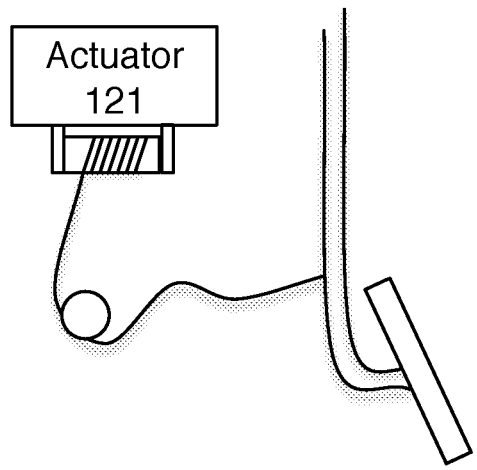

The brake actuator 121 preferably includes a rotary electric motor coupled to the brake pedal by a steel cable; in this implementation, braking is performed by winding the steel cable around a spool, which tightens the steel cable and actuates the brake pedal. Likewise, tension in the steel cable can be relieved (e.g., by allowing the cable to unwind) to release the brakes. This brake actuator 121 has the advantage of not interfering with manual braking intervention; that is, a user may still press on the brakes if actuation of the brakes beyond that provided by the brake actuator 121 is desired, as shown in FIGS. 5A and 5B. Note that while the brake actuator 121 preferably is coupled to the brake pedal by a steel cable, the brake actuator 121 may be coupled to the brake pedal by any other means (e.g., a monofilament cable, a swingarm, a chain).

In this implementation, the brake interface 120 may include pulleys, rollers, cable guides, and/or any suitable hardware to route the cable between the brake actuator 121 and the brake pedal. The brake interface 120 may also include any other hardware to enable braking actuation (e.g., line tensioners, springs, etc.)

Additionally or alternatively, the brake actuator 121 may actuate the brake pedal in any suitable manner.

In a second implementation of a preferred embodiment, the brake actuator 121 may actuate the brakes of the vehicle by increasing the pressure of a hydraulic fluid within the brake line. In this implementation, the brake actuator 121 may include a master cylinder assembly, which functions to convert non-hydraulic pressure (e.g., pressure due to the actuation of the brake pedal) into hydraulic pressure that can be used for braking. The master cylinder assembly is preferably actuated on one end by some means (e.g., the brake pedal, a command from the central computer 150, etc.); upon actuation, a piston moves along a bore of the master cylinder assembly, in the process moving one or more pistons at one or more slave cylinder ends by pushing against brake fluid contained within the master cylinder assembly. By varying the relative surface areas of the piston within the bore and the one or more slave cylinder ends, one can create a mechanical advantage that can be leveraged for braking. The brake fluid is preferably an incompressible fluid (e.g., glycol-ether based fluids, mineral oil, silicone, etc.) but can alternatively be compressible (e.g., air) or any other suitable brake fluid.

In a variation of the second implementation, the brake actuator 121 may include one or more master cylinder assemblies. In this variation, one or more of the master cylinder assemblies may be actuated in a first manner (e.g., actuation of the brake pedal) and one or more of the remaining master cylinder assemblies may be actuated in a second, different manner (e.g., in response to a command from the central computer 150). The plurality of master cylinder assemblies may include any suitable number of master cylinder assemblies, may be actuated in any suitable manner, and can be used in any suitable combination and/or configuration.

In this implementation, the brake actuator 121 preferably includes an electric brakeline actuator (e.g., a brake booster) that increases the pressure of brake fluid to result in actuation of the brake pistons with a greater force (and thus, more efficient braking). Suitable brakeline actuators may include vacuum-actuated brake boosters (which may harness a pressure differential between atmosphere and a relative pressure vacuum in the booster chamber created by the engine to increase brake fluid pressure), hydraulic-actuated brake boosters (which may route power steering fluid into a cavity behind the booster chamber and may include a pressure accumulator to increase brake fluid pressure), electro-hydraulic brake boosters (which may harness a pressure differential between atmosphere and a relative pressure vacuum in the booster chamber created by an electric pump in combination with a pressure accumulator to increase brake fluid pressure), air brake boosters (which leverage air compressors to drive the brake pistons against the brake fluid), or any other suitable brakeline actuator. This implementation may also combine any suitable number and/or any suitable type of brakeline actuators.

In this implementation, the brake actuator 121 is preferably controlled directly by the central computer 150, but may additionally or alternatively be controlled in any manner (e.g., by the car's ECU). The brake actuator 121 is preferably installed in the hydraulic braking lines of a car prior to an Anti-Lock Brake System (ABS), such that the brake actuator 121 does not interfere with modulation to brakeline pressure due to ABS, but the brake actuator 121 may be installed in any manner (e.g., before ABS, after ABS, on brake lines without ABS).

Figure 6:
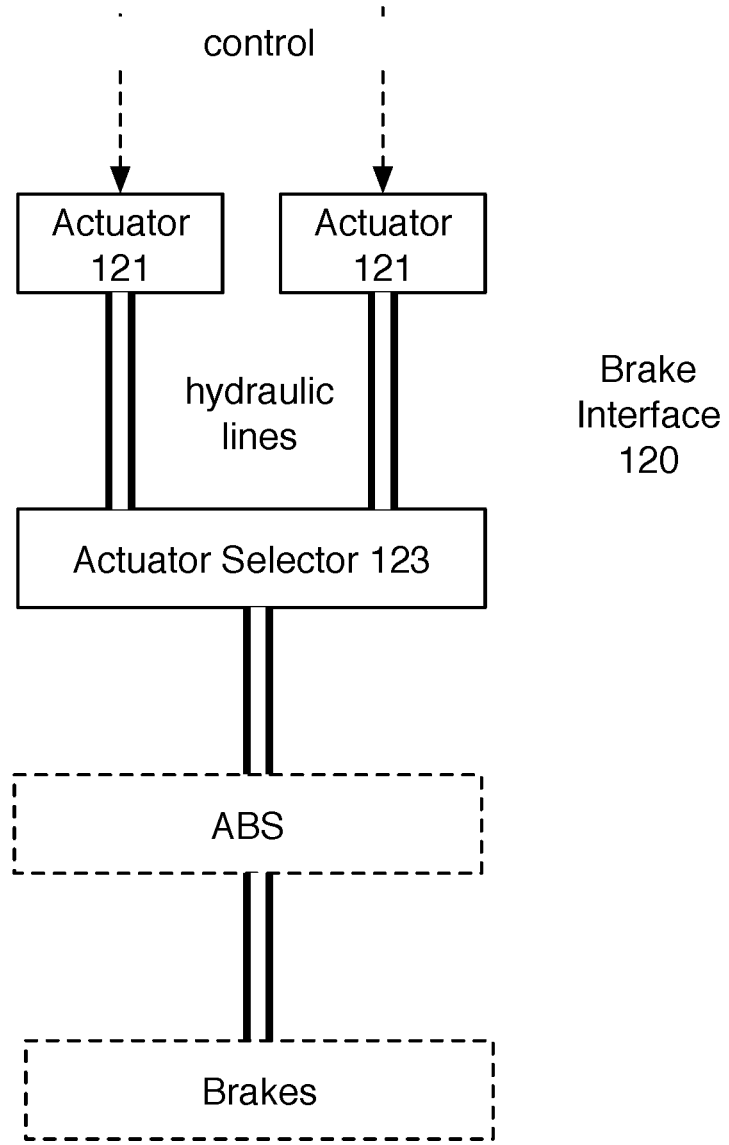
FIG. 6 is a diagram representation of a brake interface of a system of an invention embodiment.

In a variation of the second implementation, the brake interface 120 includes two (or more) hydraulic brake actuators 121, as shown in FIG. 6. By adding a second hydraulic brake actuator 121, the brake interface 120 increases braking system redundancy (and thus safety). In this variation, the brake interface 120 preferably further includes an actuator selector 123.

The actuator selector 123 functions to mediate pressure application by multiple brake actuators 121. The actuator selector 123 preferably selects one of the brake actuators 121 to apply pressure to the brake, but may additionally or alternatively select a combination of brake actuators 121, or may modify brake actuator 121 brakeline effects in any manner.

Figure 7:
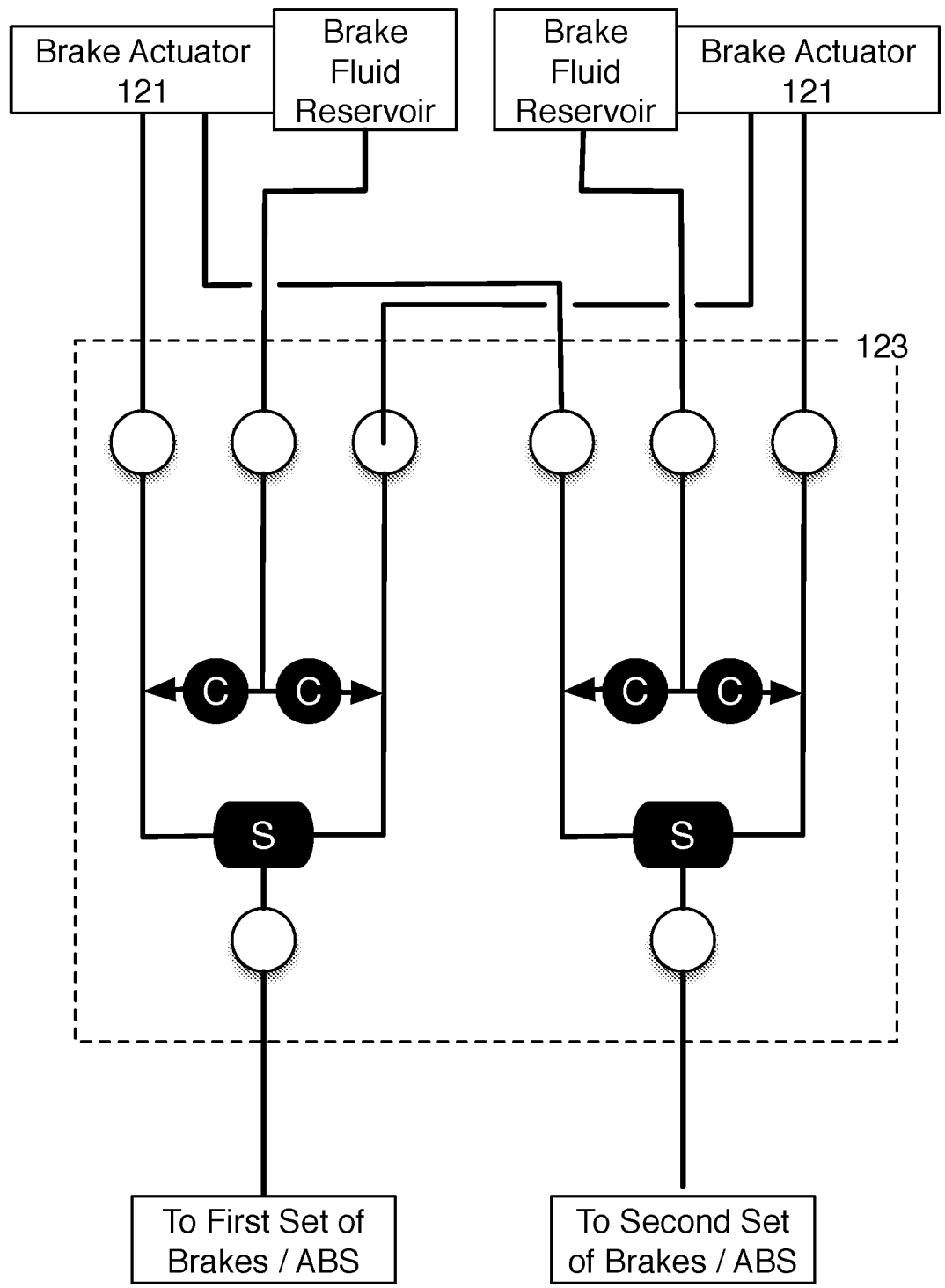
FIG. 7 is a diagram representation of an actuator selector of a brake interface of a system of an invention embodiment.

The actuator selector 123 is preferably a passive manifold including a series of shuttle valves and check valves, as shown in FIG. 7, but may additionally or alternatively be any structure capable of performing brake actuator 121 selection. Note that as shown in FIG. 7, the actuator selector 123 is implemented for a braking system having two sets of brakes (e.g., front and rear brakes). A person of ordinary skill in the art will recognize that this system may be implemented for any number of sets of brakes, each of which may include any number of brakes.

The actuator selector 123 preferably utilizes a shuttle valve for each set of brakes; the shuttle valve couples each brake actuator 121 to a set of brakes. The shuttle valve (labeled 'S') preferably couples the brake actuators 121 selectively based on pressure; that is, the brake actuator 121 with higher line pressure is coupled to the set of brakes through the shuttle valve while brake actuators 121 with lower line pressure are isolated from the set of brakes by the valve. Alternatively, the shuttle valve can couple the brake actuators 121 selectively to the brakes by coupling brake actuators 121 with the lower line pressure and isolating brake actuators with the higher line pressure, or in any other suitable manner. Additionally, the shuttle valve can selectively couple the brake actuators 121 to the set of brakes based on any other suitable condition(s) of the fluid (e.g., viscosity, temperature, density, etc.). Examples of suitable shuttle valves may include balanced poppet-type shuttle valves, unbalanced poppet-type shuttle valves, slide-type shuttle valves, solenoid-operated shuttle valves, or any other suitable type of shuttle valve. The shuttle valve may be substituted for any suitable valve capable of selectively coupling the brake actuators 121 to the set of brakes.

The actuator selector 123 may additionally utilize check valves (or other similar one-way valves) to allow lines to refill from one or more brake fluid reservoirs coupled to the brake actuators. The check valves preferably allow brake fluid to flow from the reservoir to one or more of the brake lines coupled to the brake actuators 121, but not in the opposite direction (i.e., to the reservoir from the brakes). These check valves are often important when braking is released; lower pressure on a brake line may result in the shuttle valve closing to that line (preventing it from replenishing brake fluid if not for the check valve and reservoir connection). Examples of suitable check valves may include ball check valves, diaphragm check valves, swing check valves, clapper valves, stop-check valves, lift-check valves, in-line check valves, duckbill valves, pneumatic non-return valves, or any other suitable type of check valve. The check valves may be substituted for any suitable valve capable of enabling lines to obtain fluid from a brake fluid reservoir.

In this variation, the brake interface 120 may include one or more fluid sensors (e.g., fluid pressure sensors, temperature sensors, viscosity sensors, density sensors, etc.). These fluid sensors preferably provide information on the status of brakes, brake lines, and/or components of the brake interface 120. As a first example, fluid pressure sensors may sense that brake fluid pressure is lower than a critical threshold necessary for safe operation of the system 100; in this case, the pressure sensor may send pressure sensor data to the central computer 150 which can alert the user (e.g., via a brake light signal, via an audio cue, etc.) and/or place the system 100 in a temporary backup safe mode (e.g., reverting to a backup system that can be used until the user can service the car, such as a mechanical backup/emergency braking system). As a second example, fluid temperature sensors may sense that brake fluid temperature has risen above a boiling point of the brake fluid. This is particularly important for hydraulic systems—brake fluid vapor is highly compressible relative to its liquid state, and so electric brakeline actuators which rely on the buildup of brake fluid pressure to facilitate hydraulic transfer of the braking force will fail if the brake fluid is substantially vaporized. In this second example, the temperature sensor may include several boiling point thresholds; for example, one boiling point threshold may correspond to the "dry" boiling point of the brake fluid (i.e., the boiling point of the dehydrated brake fluid), while another boiling point threshold may correspond to the "wet" boiling point of the brake fluid (i.e., the boiling point of the fluid after absorbing moisture). Some commonly used brake fluids (e.g., glycol-ether) are hygroscopic—they absorb a considerable amount of water from the atmosphere under normal humidity conditions, and their wet boiling point is usually much lower than their dry boiling point. Temperature sensors may communicate with the central computer 150 to undertake a first corresponding action (e.g., notifying the user, engaging a brake fluid cooling component, etc.) in response to brake fluid temperature exceeding a first threshold and then a second corresponding action (e.g., disabling the anti-lock braking system) in response to brake fluid temperature exceeding a second threshold. As a third example, viscosity sensors may sense that brake fluid viscosity has increased above a usable threshold and correspondingly alert the central computer 150. For consistent and reliable brake system operation, it is generally preferably to maintain the brake fluid at a constant viscosity under a wide range of temperatures (including avoiding excessive thickness in extreme cold and excessive thinness in extreme heat). Generally, maintaining an approximate range of brake fluid viscosity between 1-2000 centistokes (squared millimeters per second) ensures safe hydraulic braking operation, although the ideal range may extend below or above this range depending on the particular brake fluid used or details of the operating environment. As a fourth example, density sensors may be used to infer the viscosity of the brake fluid. For a Newtonian fluid (which describes a large class of fluids), the fluid density is inversely proportional to its dynamic viscosity. Sensors may be implemented in any part of the brake interface, but are preferably implemented in the actuator selector 123. Fluid pressure sensors may include piezoresistive gauges, capacitive gauges, electromagnetic gauges, piezoelectric gauges, optical gauges, potentiometric gauges, thermal conductivity gauges, ionization gauges, or any other suitable type of fluid pressure gauge. Fluid temperature sensors may include thermal expansion thermometers, constant volume thermometers, radiometric thermometers, or any other suitable fluid thermometer. Fluid viscosity sensors may include a glass capillary viscometer, a Zahn cup, a Ford viscosity cup, a Stormer viscometer, a vibrating viscometer, an acoustic rheometer, a shear rheometer, an extensional rheometer, or any other suitable viscometer or rheometer. Fluid density sensors may include a hydrometer, a dasymeter, a Coriolis flow meter, or any other suitable type of density sensor.

In another variation of a preferred embodiment, the brake actuator 121 may actuate brakes of the vehicle in a manner other than by interfacing with the brake pedal or with the hydraulic braking system. In this variation, the brake actuator 121 may actuate the brakes by electronic means; the brake actuator 121 may send a signal to the car ECU to apply brakes (or alter regenerative braking characteristics, etc.). If the car has electronic brakes, the brake actuator 121 may potentially communicate directly with the brakes.

Note that while the friction brakes commonly found on automobiles are an obvious example of brakes that may be actuated by the brake actuator 121, the brake actuator 121 may additionally or alternatively actuate any other type of brake or slowing mechanism. For example, the brake actuator 121 may be used to deploy flaps that slow a car by increasing drag (or even a parachute). As a second example, the brake actuator 121 may actuate regenerative brakes to convert and store some fraction of the car's kinetic energy into potential energy that can be used subsequently. Examples of regenerative brakes may include brakes with an electric motor, powered by the kinetic energy of the car, acting as an electric generator that stores the energy in a capacitor; brakes that convert the kinetic energy into chemical potential energy stored in a battery; brakes that convert and store the kinetic energy of the car into a different type of mechanical kinetic energy via a rotating flywheel; brakes that convert kinetic energy into potential energy stored in compressed air, whereby the energy of a wheel goes towards powering a hydraulic pump that pressurizes an accumulator in the brakeline actuator; or any other suitable type of regenerative brake.

Figure 8:
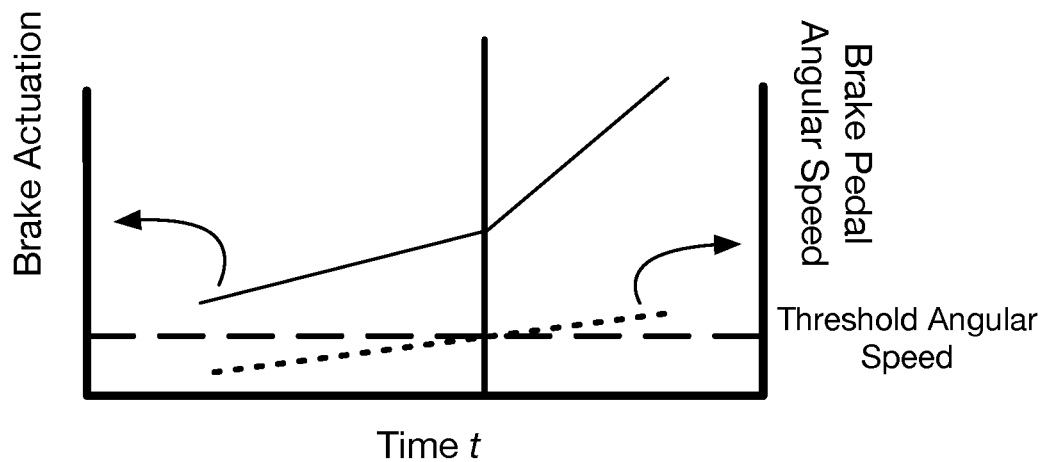
FIG. 8 is a graphical representation of an operating braking interface of a system of an invention embodiment.

The pedal sensor 122 functions to measure actuation of the brake pedal. The pedal sensor 122 preferably gives feedback on the position of the pedal; this allows the system 100 to detect both that the brake actuator 121 is operating correctly (if the brake actuator 121 operates by actuating the brake pedal) and that a user is intervening (i.e., pressing on the brake pedal manually). The pedal sensor 122 preferably provides feedback to the central computer 150, but may additionally or alternatively provide feedback directly to the brake actuator 121. For example, and as shown in FIG. 8, if the pedal sensor 122 detects rapid brake actuation, the pedal sensor 122 may immediately direct the brake actuator 121 to perform emergency braking (which may be faster than actuation by a user's foot). Deciding that rapid brake actuation has occurred is preferably accomplished by the central computer 150, but alternatively may be accomplished by any other suitable component of the system 100. This decision can be based on brake actuation exceeding a threshold rate (which can be pre-programmed or dynamically adjusted), based on a machine learning algorithm trained by monitoring user behavior, or in any other suitable manner.

The pedal sensor 122 may be any suitable sensor capable of measuring pedal actuation; for example, the pedal sensor 122 may be a string potentiometer connected to the brake pedal. As additional examples, the pedal sensor 122 may be an inductive sensor that detects the mass of the brake pedal, or an optical sensor that detects pedal position based on light occlusion.

The pedal sensor 122 preferably detects pedal position, but may additionally or alternatively detect pedal motion. For example, the pedal sensor 122 may have a sensor sample rate high enough to detect when rapid brake actuation occurs. The pedal sensor 122 may also detect other aspects of the pedal. For example, the pedal sensor 122 may include a pressure sensor on the surface of the pedal; if the pressure on the surface of the pedal exceeds a threshold surface pressure, this could be an indication that the user is trying to manually assist in braking, and the central computer 150 could use the surface pressure data of the pedal in making a decision about performing emergency braking.

The brake interface 120 may include multiple brake actuators 121 and pedal sensors 122. For example, the brake interface 120 may include a brake actuator 121 for the main brakes as well as a brake actuator 121 for a handbrake (potentially connected to a handbrake cable). As a second example, the brake interface 120 may include multiple brake actuators 121 per set of brakes; this may provide a redundancy advantage in case a particular brake actuator 121 malfunctions.

Additionally or alternatively, the brake interface 120 may control braking electronically (e.g., by simulating analog brake signals at an electrical input of a vehicle computer).

Figure 9:
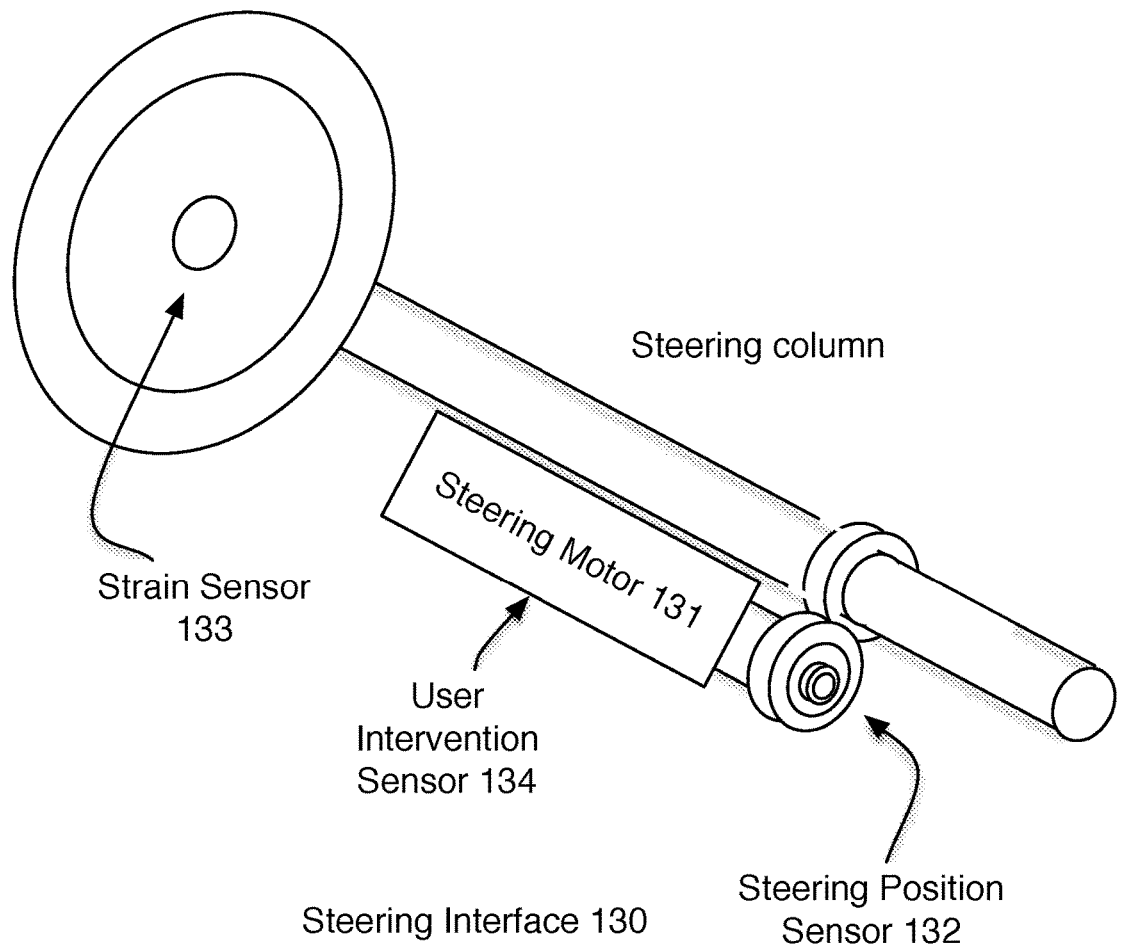
FIG. 9 is a diagram representation of a steering interface of a system of an invention embodiment.

The steering interface 130 functions to control steering of the car, as shown in FIG. 9. The steering interface preferably includes a steering motor 131 and may additionally include a steering position sensor 132 and/or a strain sensor 133.

The steering interface 130 preferably controls steering in response to input from the central computer 150. The steering interface 130 preferably controls steering by applying torque to the steering column of the car, but may additionally or alternatively control steering in any suitable manner (for example, by sending steering signals to a car ECU, or by applying power to one wheel but not an opposing wheel via signals sent to independent wheel motors).

The steering motor 131 functions to apply torque to the steering column. The steering motor 131 is preferably a high-torque DC motor, but may additionally or alternatively be an AC motor, a permanent magnet motor, a brushed motor, a brushless motor, a variable-frequency drive motor, a wound-rotor induction motor, a wound-rotor synchronous motor, a switched reluctance motor, a synchronous reluctance motor, or any other suitable motor.

The steering motor 131 preferably interfaces with the steering column via a pulley or gear clamped to the steering column, as shown in FIG. 9. The steering motor 131 preferably includes a corresponding pulley or gear. In the case of gears (direct drive), the gears are preferably meshed, although the steering motor 131 may include a mechanism to disengage the gears. In the case of pulleys, the steering motor pulley is preferably coupled to the steering column pulley via a timing belt or timing chain. The steering motor 131 may additionally or alternatively couple to the steering column in any suitable way (for instance, the steering motor 131 may couple to the steering wheel).

The steering interface 130 may include a clutch (either in the steering motor 131 or coupled to the steering column) to enable the steering motor 131 to be dynamically engaged or disengaged with the steering column. Such a clutch (or other mechanism) may be useful either to respond to failure of the steering interface 130 or to prevent the steering motor 131 from adding resistance to the steering wheel when no torque is being applied by the steering motor 131. Alternatively, the steering interface 130 may include any mechanism or may be configured in any manner to enable engagement and disengagement with the steering column if such operation is desired.

If the steering interface 130 includes a clutch, the clutch is preferably electrically operated. The clutch may be connected to a relay or other failsafe mechanism that disengages the steering motor 131 from the steering column in case of malfunction.

Figure 10:
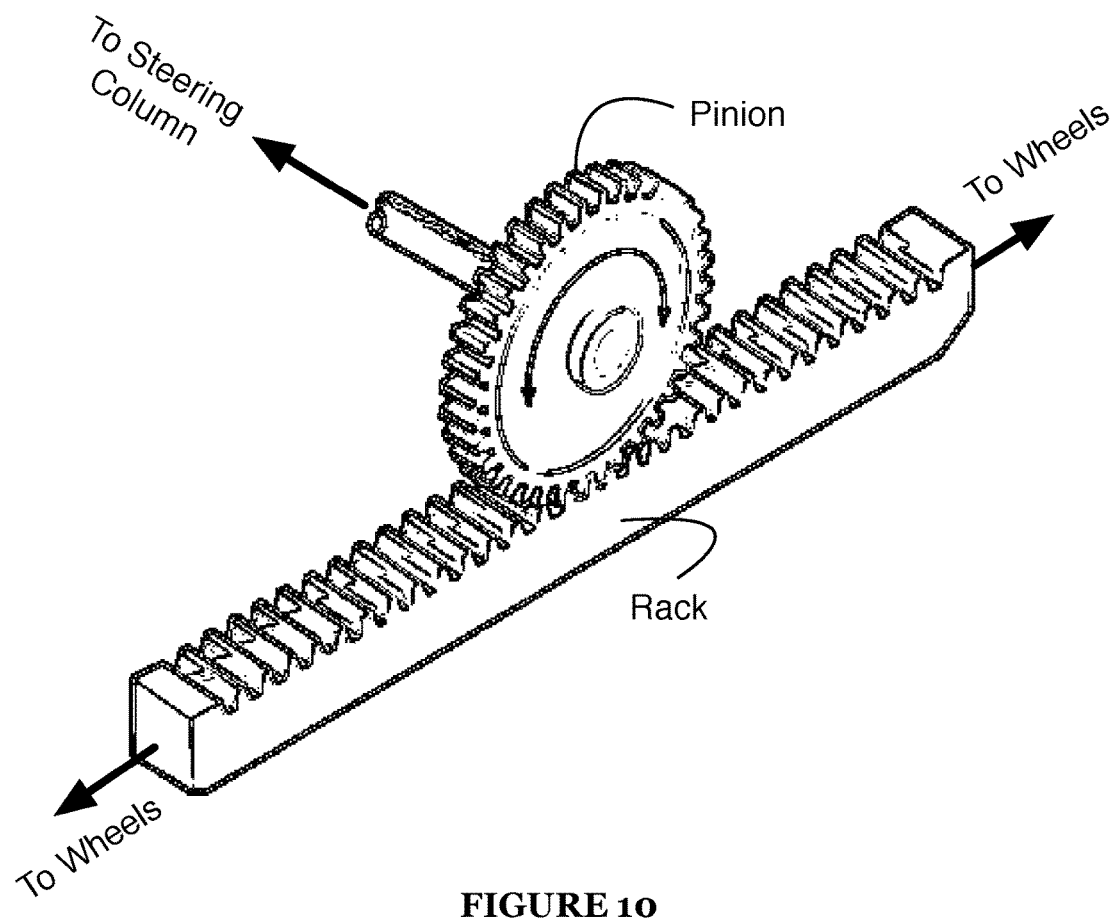
FIG. 10 is a diagram representation of a coupling mechanism between a steering column and a steering interface of a system of an invention embodiment.

In a variation of a preferred embodiment, the steering interface 130 may be coupled to the steering column using an internal flywheel. In this variation, the internal flywheel may include a pinion (i.e., a circular, rotatable gear with teeth) that engages with a rack (i.e., a linear, translatable gear bar with teeth) such that rotational motion of the pinion (coupled to the steering column) induces a linear translation of the rack relative to the pinion, as shown in FIG. 10. The rack may be mechanically coupled to the wheels of the car, thereby permitting rotational motion of the steering column to be converted into directional steering of the car. In addition to converting rotational motion of the steering column into linear motion of the rack, a coupling mechanism including a rack and pinion may also provide gear reduction (i.e., make it easier for the steering column to turn the wheels). Gear reduction may be partially determined by the diameter of the pinion and/or aspects of the teeth (e.g., pitch, angle, length) of the rack and pinion gear set. In a first realization of this variation, the diameter of the pinion may be as small as can be easily manufactured in order to minimize the angular range that the steering column needs to turn in order to direct the wheels (i.e., maximize the steering ratio). In a second realization of this variation, the rack may have a different tooth density (i.e., pitch) in the center than towards its ends in order to provide variable-ratio steering; this may be useful in enabling the car to respond quickly when starting a turn and to assist in turning the wheels near the limit of the wheels' turning radius. In a third realization of this variation, power steering can facilitate gear reduction. Examples of such power steering may include hydraulic power steering, electro-hydraulic power steering, electric power assisted steering (or motor-driven power steering), electrically variable gear ratio power steering, or any other suitable power steering system.

Figure 11:
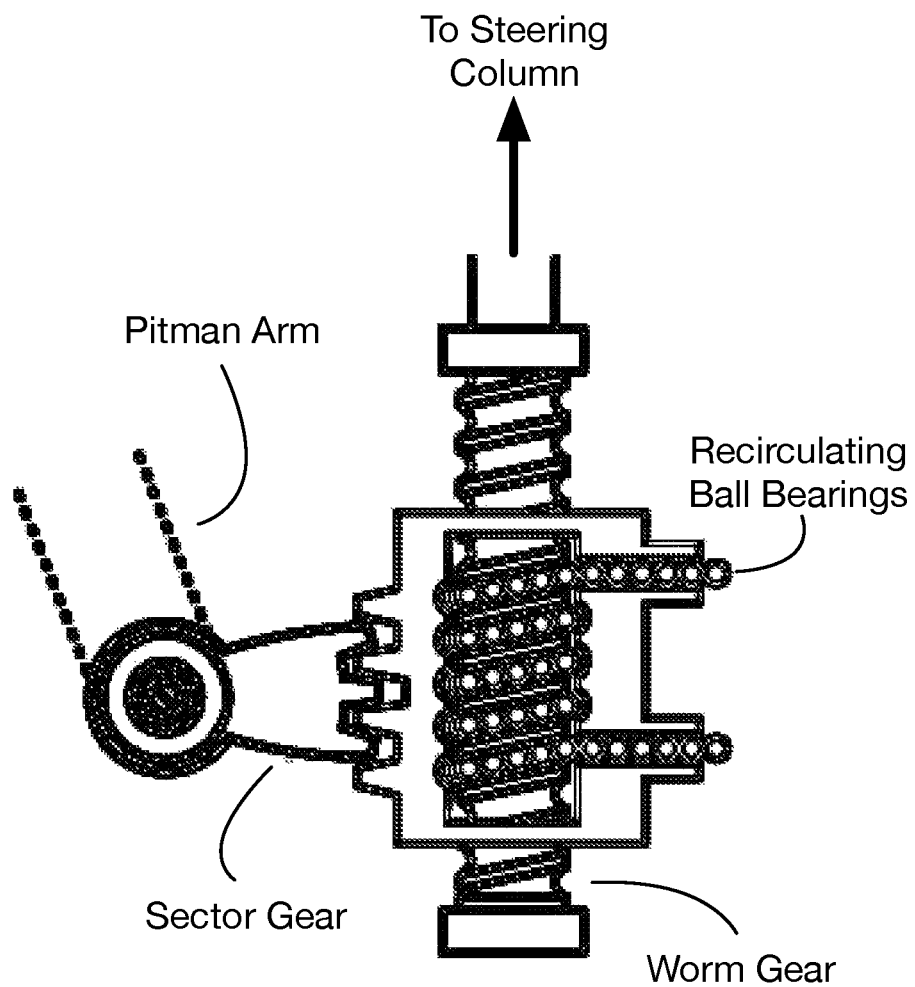
FIG. 11 is an alternative diagram representation of a coupling mechanism between a steering column and a steering interface of a system of an invention embodiment.

In another variation of a preferred embodiment, the steering interface 130 may be coupled to the steering column using a recirculating ball (i.e., a worm and sector) steering mechanism, as shown in FIG. 11. This variation may be useful in larger, heavier cars, where the recirculating ball mechanism may have greater mechanical advantage as compared to the rack and pinion coupling mechanism. In this variation, rotational motion of a worm gear (due to rotation of the steering column) engages a sector gear coupled to a Pitman arm which controls the orientation of the wheels of the car. In a first realization of this variation, the recirculating ball steering mechanism may also include recirculating ball bearings situated within the threads of the worm gear to prevent wear in the worm gear and reduce steering slop. In a second realization of this variation, the recirculating ball steering mechanism may also include power steering.

Alternatively, the steering interface 130 may be coupled to the steering column in any other suitable manner.

Figure 12:
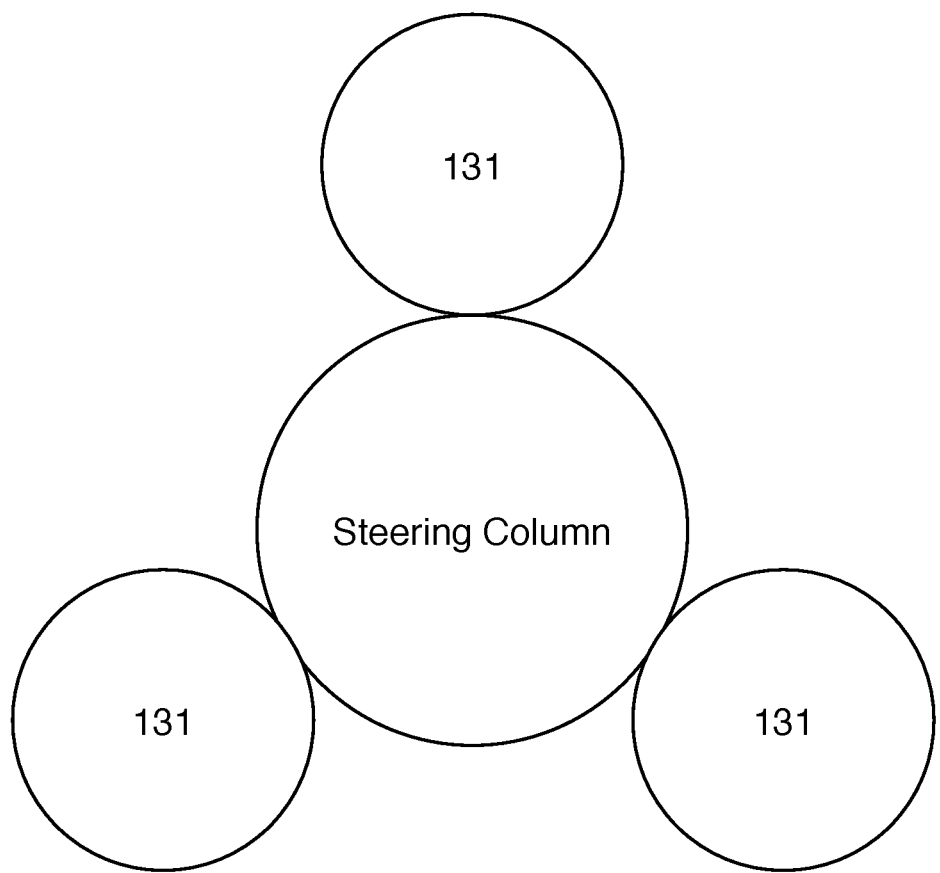
FIG. 12 is a diagram representation of a steering interface of a system of an invention embodiment.

The steering interface 130 may include multiple steering motors 131 for redundancy or for other purposes. In one example embodiment, the steering interface 130 includes three steering motors 131 arranged as shown in FIG. 12. Under normal operation, the three steering motors 131 may work together to turn the steering column (or, in some cases, only a subset of the steering motors 131 may operate in normal usage). In situations where one of the steering motors 131 applies torque inappropriately, the other two steering motors 131 may be used to override the errant steering motor 131. In order to enable the other two steering motors 131 to override the errant steering motor 131, the combined maximum power output of the other two steering motors 131 is preferably greater than the maximum power output of the errant steering motor 131.

Additionally or alternatively, steering motors 131 may be monitored for malfunction and power may be controlled individually for each motor 131 (e.g., via power relays), enabling malfunctioning motors to be powered down.

The steering position sensor 132 preferably functions to measure the rotational position of the steering motor 131; alternatively, the steering position sensor 132 may measure the rotational position of the steering column (or related values, such as angle of the vehicle wheels with respect to the chassis). These two positions are generally linked, but may differ (especially in cases where the steering motor 131 may mechanically disengage from the steering column). In some cases, the steering interface 130 may include multiple steering position sensors 132. Multiple steering position sensors 132 may be used, for instance, to determine torsion of the steering column (e.g., by measuring the difference between a steering position sensor 132 on the steering column and a steering position sensor 132 on an engaged steering motor 131).

The steering position sensor 132 preferably provides data to the central computer 150 to be used in determining operation of the steering motor 131. The steering position sensor 132 may include a plurality of steering position sensors, each communicatively coupled to the central computer 150. The central computer 150 may use the data from the steering position sensor 132 (or from any combination of steering position sensors from the plurality of steering position sensors) in combination with any other accessible data to the central computer 150 in determining the operation of the steering motor 131.

The strain sensor 133 functions to determine strain applied to the steering column, preferably as a way to measure attempted user intervention. That is, the strain sensor 133 preferably detects a driver attempting to fight steering wheel movement caused by the steering motor 131. Alternatively, the strain sensor 133 may be used for any other suitable purpose.

The strain sensor 133 preferably provides data to the central computer 150 to be used in determining operation of the steering motor 131. For example, the strain sensor 133 may indicate that a driver is attempting to turn the steering wheel; the central computer may disengage, power off, or otherwise modify motion of the steering motor 131 in response. The central computer 150 preferably determines that a driver is attempting to turn the steering wheel, but alternatively any other suitable component of system 100 can make this determination.

The strain sensor 133 is preferably a piezoelectric strain sensor attached between the steering wheel and the steering column, but may additionally or alternatively be any suitable strain sensor located in any area.

The strain sensor 133 may directly measure strain or torsion on the steering column, but user intervention may alternatively be measured in any manner.

For example, a user intervention sensor 134 may measure steering motor 131 rotational speed (changes in rotational speed potentially corresponding to applied external torque). In this particular example, steering motor 131 RPM may be analyzed in light of inertial measurement unit (IMU) measurements (e.g., to distinguish between torque applied to the steering motor by forces affecting the car's wheels and torque applied to the steering motor by a user attempting to turn the steering wheel). In other words, by estimating a heading-derived torque (i.e., the torque present on the steering wheel derived from the driving surface pushing back on the vehicle's wheels) given IMU data (e.g., accelerometer data), a rotational speed change can be calculated (further given knowledge of the steering motor's response to applied torque). This rotational speed change, added to a set rotational speed of the steering motor 131 (i.e., the speed the central computer has set the steering motor 131 to rotate at), gives an estimated steering motor 131 rotational speed. Comparing the estimated steering motor 131 rotational speed to the actual steering motor rotational speed can indicate the presence of a user-applied torque. Based on the difference between the estimated and actual speed (and/or a user-applied torque derived from this information), user intervention may be detected when the difference and/or user-applied torque exceeds some threshold. Note that this technique is capable of detecting the direction of user-applied torque; the central computer may respond differently if a user is attempting to apply torque in the direction of the steering motor 131 (e.g., increasing steering motor rotational speed) or against the steering motor 131 (e.g., decreasing steering motor rotational speed).

The user intervention sensor 134 may be any mechanical, electrical, optical, or acoustic sensor capable of detecting that a user is attempting to override automated steering.

The system 100 may additionally include other control interfaces; for example, the system 100 may interface with tire inflation systems to dynamically manage tire pressure, or with the car ECU to modify engine timing, or with external lighting (e.g., to transmit data using car taillights). If the car has a manual transmission, the system 100 may include a gear control interface that interfaces with the gear selector (and/or engine clutch).

The sensor suite 140 functions to provide information about the driving environment to the central computer 150 (to be used to provide information to drivers and for control of the throttle interface 110, the brake interface 120, and the steering interface 130). Alternatively, the sensor suite 140 may be used for any other suitable purpose.

The sensor suite 140 is preferably contained within a sensor pod mounted to the top of the car, but may additionally or alternatively be contained within a sensor pod in any suitable location or be distributed across the car (i.e., not contained within a sensor pod).

Figure 13:
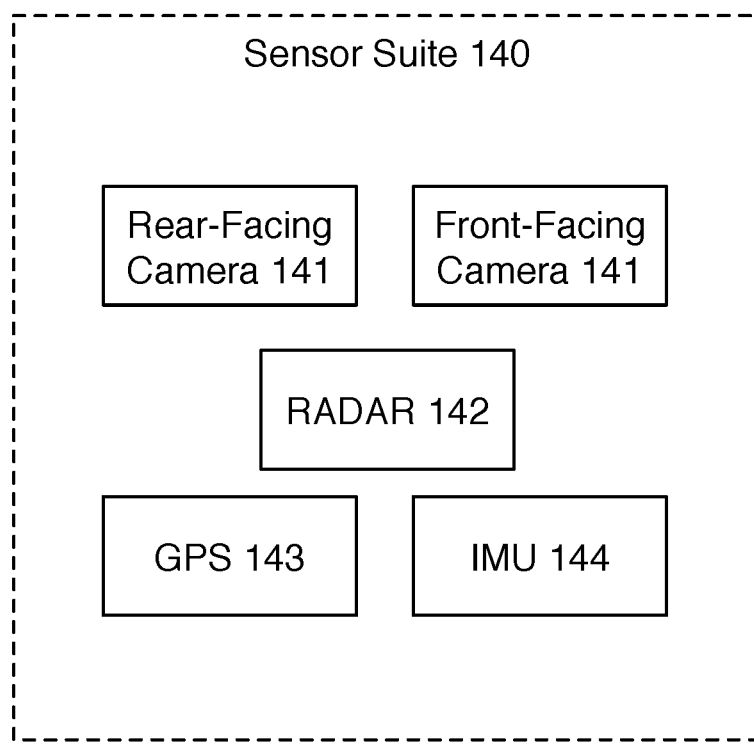
FIG. 13 is a diagram representation of a sensor suite of a system of an invention embodiment.

The sensor suite 140 preferably includes at least two cameras 141, a RADAR unit 142, a GPS unit 143, and an inertial measurement unit (IMU) 144, as shown in FIG. 13. The sensor suite may additionally or alternatively include any other sensors; for example, SONAR units, LIDAR units, microphones, photodetectors, strain gauges, and pressure monitors. The sensor suite 140 preferably includes sensors that provide information about the driving environment, including car speed, heading, acceleration (in six axes), position (e.g., using GPS), position/heading/speed of potential hazard (e.g., walls, other cars), environmental information (e.g., lane markers, presence of gravel on the road, atmospheric conditions, temperature), and/or user information (e.g., driver weight, number of passengers, cargo weight).

The cameras 141 function to provide visual information about the areas surrounding the car. The cameras 141 may additionally or alternatively be used for any other purpose (e.g., to provide visual information about the interior of the car). The cameras 141 preferably include a forward facing camera and a rear facing camera, but the sensor suite 140 may include any suitable number of cameras positioned in any manner. The forward facing and rear facing cameras 141 preferably are used to identify hazards as well as environmental information (e.g., lane markers). The cameras 141 are preferably digital cameras with high dynamic range RGB sensors, but may additionally or alternatively be any suitable cameras. For example, the sensor suite 140 may include an infrared camera or a monochrome visible light camera.

The cameras 141 are preferably wide-angle cameras, to enable visual observation of a 360-degree field around the car, but the cameras 141 may additionally or alternatively cover only a subset of the 360-degree field. In some cases, the sensor suite 140 includes side-facing cameras in addition to front and rear facing cameras.

In some implementations, cameras 141 are paired to produce stereo visual information for a particular area. For instance, the stereo visual information may be used to estimate depth information of the driving environment, which can be useful in identifying objects within the vicinity of the car and in determining the timing of actions to be performed by car (e.g., swerving out of the way of an obstacle in front of the vehicle).

The RADAR unit 142 functions to determine range between the car and potential hazards (e.g., a car in front of the car implementing the system 100). The RADAR unit 142 is preferably directed in front of the car; additionally or alternatively, the RADAR unit 142 may be directed in any suitable direction.

The RADAR unit 142 is preferably mounted to the front license plate bracket of the vehicle (and mounts using existing license plate bolt mounts), but may additionally or alternatively be mounted in any suitable location.

In one implementation of a preferred embodiment, the system 100 includes a forward-facing RADAR unit 142 and a rear-facing RADAR unit 142.

Figure 14:
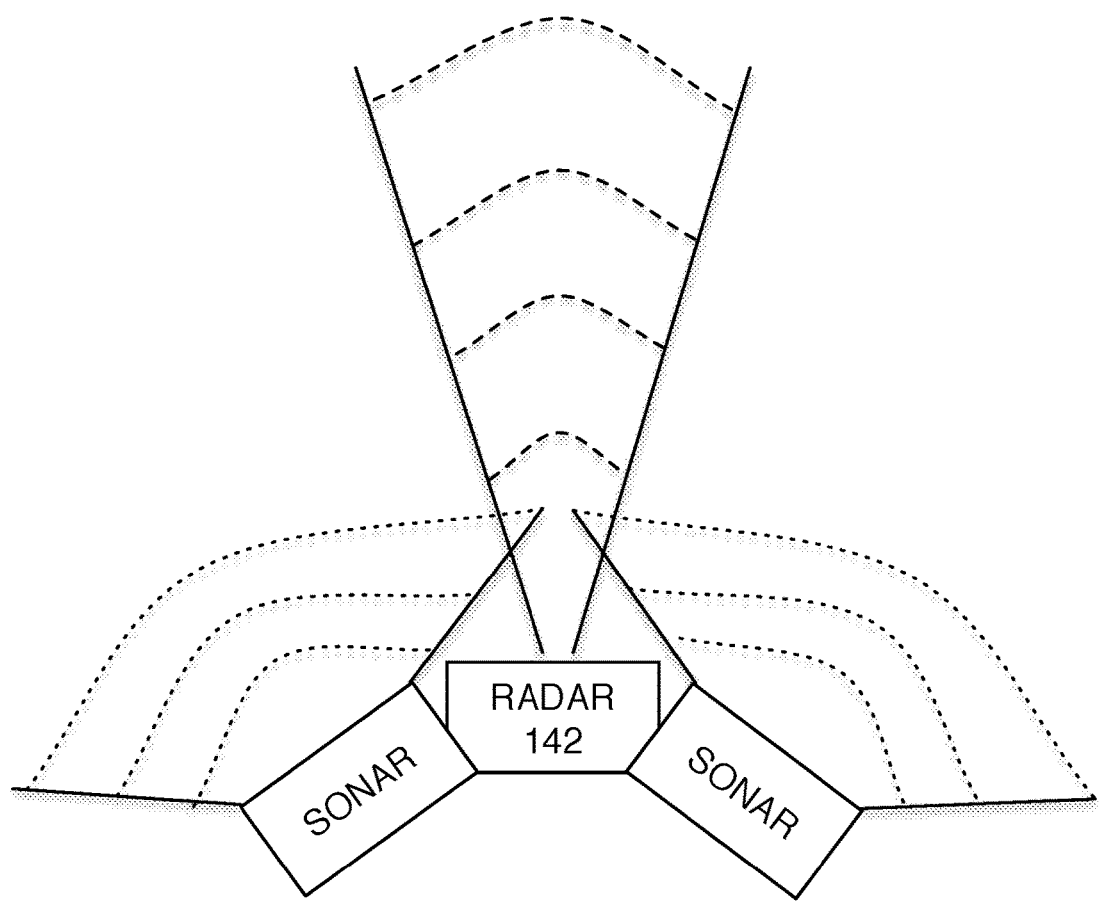
FIG. 14 is a diagram representation of RADAR and SONAR units of a sensor suite of a system of an invention embodiment.

The sensor suite 140 may additionally or alternatively include non-RADAR ranging technology. In one example implementation, the sensor suite 140 may include a forward facing RADAR unit 142 along with two angled SONAR units, as shown in FIG. 14; the RADAR unit 142 provides information about objects directly in front of the car and has a long range, while the SONAR units provide information about objects closer to the car, but within a wider angle of interest.

The GPS unit 143 functions to provide information about the position (and over time, heading) of the car. In some implementations, the sensor suite 140 may include multiple GPS units 143 (for reliability purposes).

In a variation of a preferred embodiment, the GPS unit 143 may include a real-time kinematic (RTK) corrections unit; in this variation, the GPS unit 143 may receive corrections from RTK stations with known positions (to allow for high-accuracy absolute location) or from mobile RTK stations (e.g., other cars) to allow for high-accuracy relative positioning.

The IMU 144 functions to provide information on car velocity, orientation, and observed forces (e.g., gravitational forces). The IMU 144 is preferably a 9-axis IMU (i.e., includes three orthogonal accelerometers, three orthogonal gyroscopes, three orthogonal magnetometers) but may additionally or alternatively be any suitable IMU. The IMU 144 may measure the car's position, rotation, velocity, angular velocity, acceleration, angular acceleration, specific force, torque, angular momentum and/or any other suitable quantity related to the car.

The IMU 144 is preferably mounted securely to the frame of the vehicle (such that it does not move independently of the vehicle). The IMU 144 may be located on any suitable location of the vehicle.

The IMU 144 preferably transmits raw sensor data to the central computer 150; additionally or alternatively, the IMU 144 may transmit processed data (e.g., estimated g-force) to the central computer 150.

The central computer 150 functions to control operation of the system 100. The central computer 150 processes sensed data (from the sensor suite 140 and from other sensors) in order to determine the current driving state of the car; and based upon the driving state of the car and programmed operation, the central computer 150 may modify or control operation of the car through the control interfaces 110, 120, and 130.

The central computer 150 is preferably a general-purpose computer adapted for I/O communication with the control interfaces 110, 120, and 130 and the sensor suite 140, but may additionally or alternatively be any suitable computing device.

The central computer 150 preferably receives data from the sensors of the sensor suite 140, but may additionally or alternatively receive data from any other sources. For example, the central computer 150 is preferably coupled to existing car communication interfaces (e.g., OBD II) and may obtain information such as speedometer reading, steering wheel angle, traction control status, etc.

The central computer 150 may communicate to sensors, actuators, and other systems using any suitable communication standard (e.g., USB, CAN bus, Wi-Fi, Bluetooth, etc.).

In particular, the central computer 150 may use the sensor suite 140 (and/or other sensors) to calibrate the control interfaces 110, 120, and 130. For example, accelerometers of the sensor suite 140 may be used to determine what brake pedal actuation (actuated by the brake interface 120) results in a particular braking deceleration. The mapping between outputs of the control interfaces and measured behavior of the car is preferably stored and updated by the central computer 150.

The central computer 150 may use this calibration data (and/or other data) to detect system component malfunction. For example, the central computer 150 may receive sensor data outside of typical ranges (e.g., the air temperature outside is 90 deg. C) and in this case either rely on other sensors and/or attempt to correct component malfunction. In the event that the central computer 150 detects a system component malfunction, the central computer 150 may also notify the user.

The central computer 150 preferably implements feedback systems in order to control the car (through control interfaces) to achieve a desired goal. For example, the central computer 150 may be used to place the car in an adaptive cruise control state, where the car holds a lane and automatically maintains a set distance from cars in front of it (by sensing cars and road lane markers using cameras/RADAR and controlling throttle, brake, steering).

The central computer 150 may preferably be used for any assisted or self-driving task; for example, the central computer 150 may allow the car to autonomously drive from one position to another. In cases of self-driving, the central computer 150 preferably navigates according to a stored map. The central computer 150 may update the stored map in real-time based on sensor suite 140 data.

The central computer 150 is preferably connected to the Internet via a wireless connection when available (and some tasks may be performed by remote servers). Additionally or alternatively, the central computer 150 may not include a wireless Internet connection.

The central computer 150 preferably may alter parameters of car operation (e.g., changing stored engine timing by reflashing the ECU or changing parameters through OBD-II). This alteration may be informed by monitored behavior of the user using the car, tailored to the particular user based on user-indicating preferences, dynamically adjusted during travel, or in any other suitable manner.

The user interface 160 functions to allow user interaction with the system 100. The user interface 160 is preferably coupled with the central computer 150, and allows both user modification of system 100 behaviors and notification of system 100 statuses.

The user interface 160 may allow user input in any suitable manner (e.g., joystick, keyboard, voice interface, touchscreen, etc.).

In one implementation, the user interface 160 includes a rotatable knob for enabling assisted cruise control. In this implementation, pressing the rotatable knob engages or disengages assisted cruise control, while turning the rotatable knob adjusts the set speed for the cruise control (and/or other settings).

The user interface 160 may allow output to the user in any suitable manner (e.g., via a display, via a speaker, via a data connection).

Figure 15:
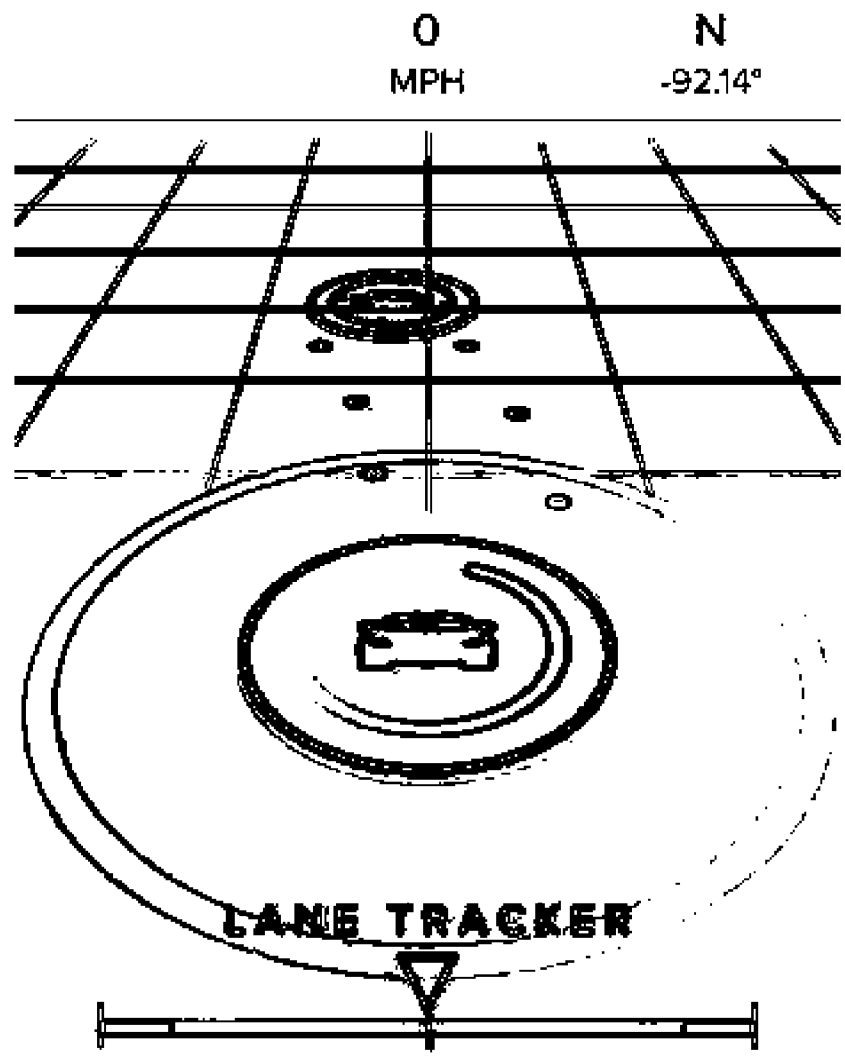
FIG. 15 is an image representation of information communicated via a user interface of a system of an invention embodiment.

In one implementation, the user interface 160 communicates assisted cruise control status via the car's built-in speakers (e.g., "Cruise enabled" or "Cruise cannot be enabled at this time"). In this implementation, the user interface 160 may transmit additional information over a wireless data connection (e.g., over Bluetooth or Wi-Fi to a smartphone or tablet). For example, the user interface 160 may couple to a smartphone app that displays the car's heading and surroundings as interpreted by the system 100, as shown in FIG. 15.

The user interface 160 preferably includes any hardware needed to communicate with the user as described above; additionally or alternatively, the user interface may utilize additional hardware (e.g., car systems, user's portable electronics) to communicate with the user.

The user interface 160 preferably communicates system operation data to the user (e.g., heading, position, status of system) and allows for modification of system operation parameters (e.g., changing the set speed of assisted cruise control, changing system driving preferences from "comfort" to "sporty", etc.).

The user interface 160 may additionally include an emergency stop button. The emergency stop button could be used by a driver (or other user) to rapidly disengage or cut off power to control actuators (e.g., 110, 120, and/or 130) in case of an emergency.

In one implementation of a preferred embodiment, the emergency stop button controls a relay on the power lines for the throttle interface 110 and the steering interface 130; pressing the button switches the relay, causing power to be cut off to the throttle interface 110 and the steering interface 130 (allowing for manual control of the throttle and the steering wheel).

As a person skilled in the art will recognize from the previous detailed description and from the figures and claims, modifications and changes can be made to the preferred embodiments of the invention without departing from the scope of this invention defined in the following claims.

We claim:

1. An autonomous vehicle retrofit system comprising:
   a central computer; and
   a braking interface configured to decelerate a wheel of a vehicle via actuation of a brake caliper, the braking interface comprising:
   a brake pedal,
   a first master cylinder assembly mechanically coupled between the brake pedal and the brake caliper such that actuation of the brake pedal causes actuation of the first master cylinder assembly;
   a first hydraulic brake line hydraulically coupled to the first master cylinder assembly such that actuation of the first master cylinder assembly causes an increase in hydraulic fluid pressure in the first hydraulic brake line;
   a second master cylinder assembly coupled between the central computer and the brake caliper such that the central computer controls actuation of the second master cylinder assembly;
   a second hydraulic brake line hydraulically coupled to the second master cylinder assembly such that actuation of the second master cylinder assembly causes an increase in hydraulic fluid pressure in the second hydraulic brake line; and
   an actuator selector hydraulically coupled to the brake caliper, further hydraulically coupled to the first hydraulic brake line and to the second hydraulic brake line, that selectively actuates the brake caliper in response to actuation of at least one of the first master cylinder assembly and the second master cylinder assembly; wherein selective actuation is determined by hydraulic fluid pressures of the first and second hydraulic brake lines
   a pedal sensor, detectably coupled to the brake pedal and communicatively coupled to the central computer; wherein the pedal sensor monitors a condition of the brake pedal and communicates pedal sensor data based on the condition of the brake pedal to the central computer; wherein the central computer controls the second master cylinder assembly based on the pedal sensor data, wherein the pedal sensor data comprises a change in a position of the brake pedal per unit time; wherein the central computer controlling the second master cylinder based on the pedal sensor data comprises the central computer actuating the second master cylinder to perform emergency braking based on the change in the position of the brake pedal per unit time exceeding a threshold brake pedal rate.

2. The autonomous vehicle retrofit system of claim 1, wherein the actuator selector further comprises a one-way check valve, fluidly coupling both of the first hydraulic brake line and the second hydraulic brake line to a brake fluid reservoir; wherein the check valve allows brake fluid to flow from the brake fluid reservoir to the first and second hydraulic brake lines; wherein the check valve prevents brake fluid from flowing from the first and second hydraulic brake lines to the brake fluid reservoir.

3. The autonomous vehicle retrofit system of claim 1, wherein the pedal sensor comprises a pedal pressure sensor; wherein pedal sensor data comprises surface pressure on a surface of the brake pedal; wherein controlling the second master cylinder based on the pedal sensor data comprises the central computer actuating the second master cylinder to perform emergency braking based on the surface pressure on the surface of the brake pedal exceeding a threshold surface pressure.

4. An autonomous vehicle retrofit system comprising:
a central computer;
a braking interface configured to decelerate a wheel of a vehicle via actuation of a brake caliper, comprising:
  a brake pedal,
  a first master cylinder assembly mechanically coupled between the brake pedal and the brake caliper such that actuation of the brake pedal causes actuation of the first master cylinder assembly;
  a first hydraulic brake line hydraulically coupled to the first master cylinder assembly such that actuation of the first master cylinder assembly causes an increase in hydraulic fluid pressure in the first hydraulic brake line;
  a second master cylinder assembly coupled between the central computer and the brake caliper such that the central computer controls actuation of the second master cylinder assembly;
  a second hydraulic brake line hydraulically coupled to the second master cylinder assembly such that actuation of the second master cylinder assembly causes an increase in hydraulic fluid pressure in the second hydraulic brake line; and
  an actuator selector hydraulically coupled to the brake caliper, further hydraulically coupled to the first hydraulic brake line and to the second hydraulic brake line, that selectively actuates the brake caliper in response to actuation of at least one of the first master cylinder assembly and the second master cylinder assembly; wherein selective actuation is determined by hydraulic fluid pressures of the first and second hydraulic brake lines; and
a steering interface, the steering interface comprising:
  three steering motors, mechanically coupled to a steering column of the vehicle; wherein the three steering motors control the steering of the vehicle by applying a torque to the steering column; wherein any two steering motors of the three steering motors have a greater maximum power output than the maximum power output of the third steering motor; wherein the steering column is further coupled to a steering wheel; wherein the steering column rotates in response to either of manual rotation of the steering wheel and actuation of the three steering motors by the central computer;
  a steering position sensor, communicatively coupled to the central computer;
  wherein the steering position sensor monitors a condition of a first steering motor of the three steering motors and communicates steering position sensor data based on the condition of the first steering motor to the central computer; and
  a sensor suite, communicatively coupled to the central computer; wherein the sensor suite monitors a condition of the driving environment and communicates sensor suite data based on the condition of the driving environment to the central computer; wherein the central computer controls the three steering motors based on the sensor suite data; and
  a user intervention sensor that measures an actual rotational speed of the first steering motor; wherein the sensor suite data comprises accelerometer data; wherein the central computer detects attempted user steering intervention by calculating an estimated rotational speed of the first steering motor and comparing the estimated rotational speed to the actual rotational speed.

5. The autonomous vehicle retrofit system of claim 4, wherein the central computer modifies operation of the three steering motors in response to detected user steering intervention.

6. The autonomous vehicle retrofit system of claim 4, further comprising a second steering position sensor detectably coupled to the steering column and communicatively coupled to the central computer; wherein the second steering position sensor monitors a condition of the steering column and communicates a second set of steering position sensor data based on the condition of the steering column to the central computer; wherein the central computer calculates an inferred torsion of the steering column from a difference of the steering position sensor data and the second set of steering position sensor data and detects attempted user steering intervention based on the inferred torsion.

7. The autonomous vehicle retrofit system of claim 4, further comprising a strain sensor, detectably coupled to the steering column and communicatively coupled to the central computer; wherein the strain sensor monitors strain of the steering column; wherein the central computer modifies operation of the three steering motors in response to the monitored strain of the steering column.

8. An autonomous vehicle retrofit system comprising:
a central computer;
a braking interface configured to decelerate a wheel of a vehicle via actuation of a brake caliper, comprising:
  a brake pedal,
  a first master cylinder assembly mechanically coupled between the brake pedal and the brake caliper such that actuation of the brake pedal causes actuation of the first master cylinder assembly;
  a first hydraulic brake line hydraulically coupled to the first master cylinder assembly such that actuation of the first master cylinder assembly causes an increase in hydraulic fluid pressure in the first hydraulic brake line;
  a second master cylinder assembly coupled between the central computer and the brake caliper such that the central computer controls actuation of the second master cylinder assembly;
  a second hydraulic brake line hydraulically coupled to the second master cylinder assembly such that actuation of the second master cylinder assembly causes an increase in hydraulic fluid pressure in the second hydraulic brake line; and an actuator selector hydraulically coupled to the brake caliper, further hydraulically coupled to the first hydraulic brake line and to the second hydraulic brake line, that selectively actuates the brake caliper in response to actuation of at least one of the first master cylinder assembly and the second master cylinder assembly; wherein selective actuation is determined by hydraulic fluid pressures of the first and second hydraulic brake lines; and a throttle interface that can change a speed of the vehicle; wherein the throttle interface comprises a switching relay, controlled by the central computer, that switches between an automatic control state and a manual control state.

9. The autonomous vehicle retrofit system of claim 8, wherein the switching relay defaults to the manual control state when the switching relay becomes inoperable due to a loss of power.

10. The autonomous vehicle retrofit system of claim 8, wherein the switching relay defaults to the manual control state when the speed of the vehicle changes above a threshold acceleration.

* * * * *